United States Patent [19]
Vincent et al.

[11] 3,876,683
[45] Apr. 8, 1975

[54] (N-CARBOXYMETHYL)BIPHENYL ACETAMIDES

[75] Inventors: Michel Vincent, Bagneux; Laszlo Beregi, Boulogne sur Seine; Georges Remond, Versailles; Jacques Duhault, Chatou; Xavier Pascaud, Paris, all of France

[73] Assignee: Science Union et Cie, Societe Francaise de Recherche Medicale, Suresnes, France

[22] Filed: May 1, 1973

[21] Appl. No.: 356,260

[30] Foreign Application Priority Data
May 5, 1972 United Kingdom............... 21095/72

[52] U.S. Cl........... 260/471 A; 260/340.9; 260/472; 260/501.11; 260/518 R; 424/309; 424/319

[51] Int. Cl.......................................... C07c 103/30
[58] Field of Search............ 260/471 A, 472, 518 R, 260/501.11

[56] References Cited
UNITED STATES PATENTS
3,770,821  11/1973  Buckler et al................... 260/518 R

*Primary Examiner*—Lorraine A. Weinberger
*Assistant Examiner*—L. A. Thaxton
*Attorney, Agent, or Firm*—Omri M. Behr

[57] ABSTRACT

The present invention relates to novel acylamino acids and their production from biphenyl 4-yl acetic acid and a glycine derivative. The compounds possess high anti-inflammatory activity without producing to a significant degree noxious side-effects.

10 Claims, No Drawings

(N-CARBOXYMETHYL)BIPHENYL ACETAMIDES

The present invention relates to novel acylamino acids and to a process for their production. More specifically the object of the present invention is to provide N-(carboxy methyl) biphenyl 4-yl acetamides of the formula I:

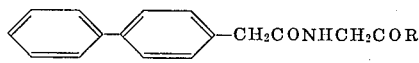
                        I wherein R is selected from the group consisting of hydroxy, lower-alkoxy, hydroxy lower-alkoxy, dihydroxy lower-alkoxy, amino lower-alkoxy, lower-alkylamino lower-alkoxy and di-lower-alkylamino lower-alkoxy.

It is an other object of this invention to provide the salts thereof with a mineral or organic base or with a mineral or organic acid.

Another object of the present invention is to provide the following specific compounds:

N-(biphenyl 4-yl acetyl) glycine
methyl N-(biphenyl 4-yl acetyl) glycinate
ethyl N-(biphenyl 4-yl acetyl) glycinate
isopropyl N-(biphenyl 4-yl acetyl) glycinate
isobutyl N-(biphenyl 4-yl acetyl) glycinate
n-decyl N-(biphenyl 4-yl acetyl) glycinate
α-glyceryl N-(biphenyl 4-yl acetyl) glycinate Generally speaking a lower-alkyl radical is defined here and thereafter as having from one to 10 carbon atoms in straight or branched chain, in opened or cyclic chain.

Another object of the present invention is the development of a process for the preparation of a derivative of the formula:

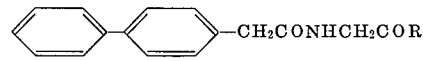

wherein R is defined as above,
which comprises the step of a. reacting a member selected from the group consisting of biphenyl 4-yl acetic acid and its functional derivatives of the formula:

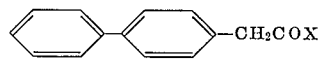

wherein X is a member selected from the group consisting of a halogen atom of atomic weight greater than 19, a radical OM wherein M is a monovalent metallic cation, a radical of the formula $OR_1$ wherein $R_1$ is selected from the group consisting of a hydrogen atom, a lower-alkyl radical, or an acyl radical of the formula $OCOR_2$ wherein $R_2$ is selected from the group consisting of a halogen atom of atomic weight greater than 19, a lower alkyl radical or the residue having the formula:

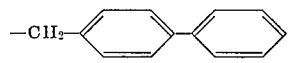

with a glycine derivative of the formula III:

                        III wherein $R_3$ is selected from the group consisting of hydroxy, a lower-alkoxy radical, a radical OM wherein M is defined as above and a heterocyclanyl lower-alkoxy radical of the formula II:

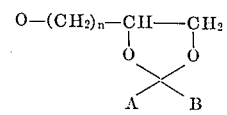
                        II wherein A and B the same or different are selected from the group consisting of lower-alkyl and phenyl radicals;
and n is an integer from 1 to 3;

b. recovering a compound of general formula IV:

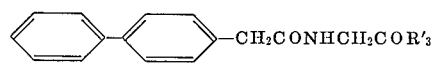
                        IV wherein $R'_3$ is selected from the group consisting of hydroxy, a lower-alkoxy radical and a heterocyclanyl lower alkoxy radical of the formula II;

c. optionally, when $R'_3$ is an alkoxy radical, saponifying in acidic or basic medium to get the free acid;

d. optionally, when $R'_3$ is an alkoxy radical, hydrolysing under alkaline conditions to get an alkali metal salt.

e. optionally, when $R'_3$ is an alkoxy radical, transesterifying the latter in the presence of a basic agent to make an ester for which $R_3$ is a member selected from the group consisting of hydroxy lower-alkoxy, dihydroxy lower-alkoxy, amino lower-alkoxy, (lower alkyl) amino lower-alkoxy, (di-lower alkylamino) lower-alkoxy and heterocyclanyl lower-alkoxy;

f. optionally, when $R'_3$ is hydroxy, salifying it with a mineral or organic base;

g. optionally, when $R'_3$ is an heterocyclanyl alkoxy radical, hydrolysing the latter in acidic medium and recovering an ester for which $R_3$ is a dihydroxy lower alkoxy radical;

h. optionally when $R'_3$ is a salt with a monovalent cation selected from the group consisting of mineral and organic bases condensing the latter with an unsubstituted or substituted alkyl halide and recovering the corresponding alkyl ester.

i. optionally, when $R'_3$ is different than hydroxy salifying the ester by addition of a mineral or organic acid.

The first step of the synthesis is preferably carried out using a functional derivative of (biphenyl 4-yl) acetic acid selected from the group consisting of chloride, anhydride and mixed anhydride, previously prepared or formed "in situ" by condensation of the free acid with a dialkyl- or a dicycloalkyl carbodiimide, or with triethylamine and a alkyl halogenoformate or with carbonyl diimidazole.

This step is further carried out in an inert solvent as for example a linear or cyclic ether, an aromatic hydrocarbon or an aprotic polar solvent.

This step is carried out in absence or in the presence of a basic agent selected from the group consisting of a tri-lower-alkylamine, and a pyridine base. The glycine derivative is preferably a lower-alkyl ester of glycine such for example methyl ester, ethyl ester or n-decyl ester.

The hydrolysis of compounds of formula IV in which $R'_3$ is an alkoxy radical is effected by means of an alkali metal carbonate or an alkali metal hydroxide, preferably at a temperature between room temperature and 120° C.

The saponification is effected using any of the known methods either under acidic conditions or basic conditions.

The transesterification step is effected by means of a high boiling aminoalkanol, lower-alkylaminoalkanol, di-lower-alkylaminoalkanol or a glycol in the presence of a basic reagent selected from the group consisting of alkali-metal, sodium hydride, sodium amide, alkali metal alkanoate such as potassium tert-butylate and sodium methylate.

The hydrolysis of heterocyclanyl alkyl esters of formula IV wherein $R'_3$ has the formula II, is effected by means of a mineral acid.

The salification of compounds of formula IV (wherein $R'_3$ is different from hydroxy) is effected by addition of a mineral acid such as halohydric acids, nitric acid, phosphoric acid, sulphuric acid or an organic acid such as acetic acid, propionic acid, lauric acid, benzoic acid, salicylic acid, citric acid, tartaric acid, fumaric acid, pyruvic acid, pamoic acid, isethionic or glucose 1-phosphoric acid.

The salification of compounds of formula IV wherein $R'_3$ is hydroxy is effected by addition of a mineral base such as alkali metal — alkaline earth metal hydroxides or carbonates, magnesia, aluminium hydroxide or ferrous salts; or of an organic base such as a tri-lower alkylamine, a di-lower alkylamine, a (lower alkyl) phenylamine, a betainic compound or an quaternary ammonium hydroxide.

The condensation between the salts and an alkyl halide is performed without solvent or with an inert solvent, preferably a polar solvent.

Another object of the present invention is to provide pharmaceutical compositions including as active ingredient at least one of the compounds of general formula I in admixtion with a pharmaceutical inert carrier.

The compounds of the present invention have interesting pharmacological properties. More particularly, they possess anti-inflammatory properties at a high level without provoking any noxious side effect in a significant degree. Furthermore, the ulcerous properties of these compounds are practically none.

As ascertained in an article of Shen (Perspectives in non steroidal anti-inflammatory agents — Angew. Chem. (intern. ed. in english) 11 (1972) 460), the present aim of the therapy is in the selection of a safer anti-arthritic candidate. The author indicated . . . better tolerated and more effective agents of this type are still needed . . . .

Blocking the acidic function of biphenyl 4-yl acetic acid with a molecule of glycine results in a very sensible decrease of the ulcerogenous properties of the starting acid.

Moreover, the alkyl esters are as active as (biphenyl 4yl) acetic acid without any ulcerogenous property.

The pharmaceutical compositions of the invention are presented under any of the forms which are suitable for oral, parenteral, rectal, percutaneous, sublingual or topic ways. They may include tablets, coated tablets, dragees, gelules, drinkable suspensions or gels, injectable or drinkable ampuls, phials, multidosis flasks, sublingual tablets, suppositories, creams lotions and pommades.

The unit dosage may vary depending of the age of the patent, the nature of the disease and the way of administration. The usual unit dosage in human therapy in the adult ranges from 100 to 400 mg, one to five times a day. The preferred daily dosage in the adult ranges from 200 to 600 mg. Other object of this invention will be apparent to any skilled person.

The following examples are given by way of illustration. They do not limit the invention in any way.

EXAMPLE 1

Ethyl N-(biphenyl 4yl acetyl) glycinate

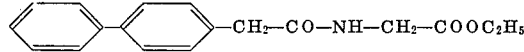

A solution of 11.2 g (0.05 mole) of biphenyl 4-yl acetyl chloride in 50 ml of anhydrous ether was added dropwise into a solution of 10.3 g (0.1 mole) of ethyl glycinate in 50 ml of anhydrous ether, while the temperature of the reaction mixture was maintained between 0° and + 5° C. This addition required one hour, then the so-obtained suspension was then kept under stirring for 15 hours, while the temperature was maintained between 20° and 25° C. The so-formed ethyl glycinate hydrochloride was suctioned off, washed twice with 50 ml of ether. These washings were evaporated to dryness, and the residue was recrystallized in ethanol. There were obtained 8.7 g of ethyl N-(biphenyl 4-yl acetyl) glycinate, M.P. 116°–116, 5° C (yield: 61.7 %).

EXAMPLE 2

Methyl N-(biphenyl 4-yl acetyl) glycinate, M.P. 126°–128° C (cyclohexane/benzene), starting from biphenyl 4-yl acetyl chloride and methyl glycinate (yield: 66.4 %) according to the method described in example 1.

EXAMPLE 3

N-(biphenyl 4-yl acetyl) glycine

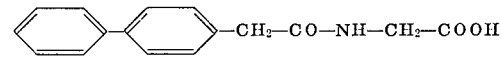

26.9 g (0.12 mole) of biphenyl 4-yl acetyl chloride were added portionwise to a solution of 11.6 g (0.1 mole) of sodium glycinate in 100 ml of water. This addition required 2 hours while the temperature was between 0° and 5° C. After the completion of the addition, the stirring was maintained for 15 hours, at room temperature. Then the so-formed precipitate was suctioned off, washed with water until complete elimination of chloride ions in the washings, then washed with ether. After drying and recrystallization from methylcellosolve, there were obtained 6.6 g of N-(biphenyl 4-yl acetyl) glycine, M.P. 228°–229° C i.e. a yield of 40.7 %.

EXAMPLE 4

Isobutyl N-(biphenyl 4-yl acetyl) glycinate, M.P. 114°–115° C (n-pentane), starting from biphenyl 4-yl acetyl chloride and isobutyl glycinate (yield: 88 %) according to the method described in Example 1.

EXAMPLE 5

Using the procedure of Example 1 and starting from (biphenyl 4-yl) acetyl chloride and isopropyl glycinate isopropyl N-(biphenyl 4-yl acetyl) glycinate is obtained melting at 115° C (recrystallization from cyclohexane-benzene).

EXAMPLE 6

Using the procedure of Example 1 and starting from (biphenyl 4yl) acetyl chloride and n-decyl glycinate, n-decyl N-(biphenyl 4-yl acetyl) glycinate is obtained melting at 112°–113° C.

The starting material n-decyl glycinate is obtained from n-decanol and chloroacetyl chloride, reacting n-decyl chloroacetate with sodium azide and reducing n-decyl azidoacetate by hydrogenation in the presence of palladium.

EXAMPLE 7

Sodium N-(biphenyl 4-yl acetyl) glycinate 30 g ethyl N-(biphenyl 4-yl acetyl) glycinate in 250 ml ethanol are mixed with 200 ml of a N solution of sodium hydroxide in water. The mixture is heated to reflux for 2 hours. After return to ambient temperature, the solvents are distilled off under vacuum. The dry residue is taken up in 120 ml hot ethanol. By cooling sodium N-(biphenyl 4-yl acetyl) glycinate crystallizes. The crystalline mixture is kept aside in a cool place for a night, then filtered; the crystals are washed with ethanol and dried.

EXAMPLE 8

α-glyceryl N-(biphenyl 4-yl acetyl) glycinate 50 ml of glycerol α-chlorhydrin and 10 g sodium N-(biphenyl 4-yl acetyl) glycinate obtained following the procedure of Example 7 are mixed together under stirring and then heated at 140°–150° C on the oil bad for 4 hours. The reaction mixture thereafter reverts to room temperature and is poored into iced water. The appeared precipitate is separated by suction, washed with water and dried.

After usual purifications, 10.8 g of α-glyceryl N-(biphenyl 4-yl acetyl) acetyl) glycinate are recovered melting at 118°–119° C.

EXAMPLE 9

(2,2-dimethyl 1,3-dioxolanyl-4) methyl N-(biphenyl 4-yl acetyl) glycinate 5.8 g of methyl N-(biphenyl 4-yl acetyl) glycinate are dissolved in 25 g of (2,2-dimethyl 1,3-dioxolanyl-4) methanol. 0.25 g of sodium methylate are added to this solution which is then heated to 120° C for 4 hours.

Thereafter, excess of (2,2-dimethyl 1,3-dioxolanyl-4) methanol is distilled off. The residue is taken up in 50 ml ether. The organic solution is washed with water, dried on magnesium sulphate and evaporated to dryness.

After recrystallization from isopropanol, 1.72 g of pure (2,2-dimethyl 1,3-dioxolanyl-4) methyle N-(biphenyl 4-yl acetyl) glycinate are recovered.

Using the same procedure with diethylaminoethanol, morpholinoethanol or 1-tert-butylamino 2-propanol as reactant, the corresponding esters are obtained.

The (2,2-dimethyl 1,3-dioxolanyl-4) methyl ester may be further hydrolysed to the α-glyceryl ester of Example 8.

Pharmacological Study a. Acute Toxicity

The acute toxicity is determined on lots of 10 mice (strain CD) weighing about 20 g to which increasing doses are administered by oral way. The control animals received only the solvent. The animals are kept in observation for a period of 8 days and deathes are noticed.

The average letal dosis ($LD_{50}$) are determined graphically. It has been found greater than 1 g/kg for ethyl N-(biphenyl 4-yl acetyl) glycinate and N-(biphenyl 4-yl acetyl) glycine;

close to 0,5 g/kg for (biphenyl 4-yl) acetic acid selected for comparison.

On the rats, the $LD_{50}$ are comprise between 1 and 2g/kg for the compounds of the invention and between 0,5 g and 1 g for (biphenyl 4-yl) acetic acid.

b. Anti-inflammatory Activity

The anti-inflammatory activity of the compounds of the invention has been demonstrated by the following tests:

oedema with carraghenin according to the procedure described by C. A. Winter, P.S.E.B.M. 111 (1962) 544.

The average active dosis ($ED_{50}$) is about 20 mg/kg for the compounds of Examples 1 and 3 greater than 80 mg/kg for phenylbutazone and 5 mg/kg for biphenyl 4-yl acetic acid as comparison substances.

oedema provoked by intraplantar injection of kaolin (Hillebrecht Arzneim. Forschung 4 (1954) 607).

The compounds to be tested and the substances of comparison (phenylbutazone, (biphenyl 4-yl) acetic acid) are administered orally. The degree of inflammation is appreciated 48 hours after the intra-plantar injection of kaolin.

At a total dosis of 190 mg/kg, the compounds of invention gave from 83 to 95 % of inhibition of the inflammation, biphenyl 4-yl acetic acid gave a value of 53 % and phenylbutazone a value of 44 %.

Test of U.V. Erythema

According to the procedure described by J. C. Le Douarec in Revue Francaise Etudes Cliniques 13 (1968) 631, at a total dosis of 48 mg/kg given orally, Ethyl N-(biphenyl 4-yl acetyl) glycinate gave 39 % of inhibition of the erythema.

Under the same conditions (biphenyl 4-yl) acetic acid gave only 18 % of inhibition, phenylbutazone 45 % of inhibition and niflumic acid 38 % of inhibition.

Test with Cotton Granuloma Pouch

According to the procedure described by R. Meier, Experientia 6 (1950) 469.

At a total dosis of 60 mg/kg per os, Ethyl N-(biphenyl 4-yl acetyl) glycinate decreases of 49 % the weight of the dry granuloma pouch, whereas (biphenyl 4-yl) acetic acid at the same dose decreases of only 38 %, phenylbutazone of 15 %, niflumic acid 22 % and mefenamic acid 17 %.

c. Search of an Ulcerogenous Activity

Lots of 4 male rats (strain CD) weighing from 150 to 175 g are given orally the tested compounds at nearly the average active dosis on anti-inflammatory tests. The administrations are repeated for 14 consecutive days. The day after rats are killed and the stomaches are taken off, washed and spread out.

The presence of any damage of the gastric mucosa is then searched with a binocular lens. The lesions are coded as follows:

+ small oedema
++ superficial lesion like a pin-point or a small groove
+++ broad superficial lesion
++++ deep lesion More ¼ of + is added for any bloody lesion.

An ulcerous index is then calculated for each stomach multiplying the number of lesions by the number of + just determined. An average value of these indexes are thereafter calculated for each lot of rats, only for those which have any lesion of the gastric mucosa.

Under such conditions, the comparison between the various anti-inflammatory drugs takes account both of the number or percentage of damaged animals and the ulcerous index which reflects the seriousness of any lesion when present.

The results are summarized in the following Table.

It appears that the compounds of the invention at a dosis twice that equal to the avery effective anti-inflammatory dosis (twice the $ED_{50}$) have a very weak ulcerogenous activity, by far of that of the comparison substances.

The compounds of the invention manifest a very significant distinction with the known anti-inflammatory drugs as regard to the aggresive action against the gastric mucosa for example (biphenyl 4-yl) acetic acid, niflumic acid and phenylbutazone.

The lesions, if any, provoked by the compounds of the invention are less numerous and milder than that occuring after treatment with the substances of comparison.

| TREATMENT | | NUMBER OF RATS | NUMBER OF RATS HAVING bloody mucosa | NUMBER OF RATS HAVING local irritation | PERCENTAGE OF RATS HAVING ULCERS | AVERY ULCEROUS INDEX |
|---|---|---|---|---|---|---|
| Controls: | | | | | | |
| Sp Gomme | 0,2 ml/100 g | 8 | — | — | — | 0 |
| Compound of ex. 1 | 20 mg/kg | 8 | 8/8 | — | — | 1 ± 0 |
| | 40 mg/kg/j | 8 | 1/8 | — | 37,5 | 2,6 ± 0,57 |
| Compound of ex. 3 | 20 mg/kg/j | 8 | | 6/8 | — | 1 ± 0 |
| | 40 mg/kg/j | 8 | | 4/8 | 12,5 | 1,6 ± 0,67 |
| Phenyl Butazone | 100 mg/kg/j | 8 | — | — | 100 | 18,1 ± 3,78 |
| Niflumic Acid | 40 mg/kg/j | 8 | — | — | 100 | 7,4 ± 4,28 |
| Compound C | 4 mg/kg/j | 8 | — | ⅛ | 37,5 | 2,25 ± 0,73 |

An index of 1 ± 0 indicates that under the experimental conditions, all the rats of the same lot have a lesion coded +
Compound C is (biphenyl 4-yl) acetic acid.

We claim:
1. a. A (N-carboxymethyl) biphenyl acetamide of the formula I:

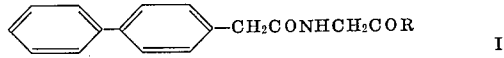

wherein R is selected from the group consisting of hydroxy, lower-alkoxy, hydroxy lower-alkoxy, dihydroxy lower-alkoxy, amino lower-alkoxy, (lower-alkylamino) lower-alkoxy and (di-lower-alkyl) amino lower-alkoxy radicals,
  b. the pharmaceutically-acceptable base addition salts thereof when R is hydroxy, and
  c. the pharmaceutically-acceptable acid addition salts thereof when R is other than hydroxy.

2. A pharmaceutically acceptable salt of a compound of claim 1 wherein R is hydroxy with a mineral or organic base.

3. A pharmaceutically acceptable salt of a compound of claim 1 wherein R is different than hydroxy with a mineral or organic acid.

4. N-(biphenyl 4-yl acetyl) glycine, being a compound of claim 1.

5. Methyl N-(biphenyl 4-yl acetyl) glycinate, being a compound of claim 1.

6. Ethyl N-(biphenyl 4-yl acetyl) glycinate, being a compound of claim 1.

7. Isopropyl N-(biphenyl 4-yl acetyl) glycinate, being a compound of claim 1.

8. Isobutyl N-(biphenyl 4-yl acetyl) glycinate, being a compound of claim 1.

9. n-decyl N-(biphenyl 4-yl acetyl) glycinate, being a compound of claim 1.

10. α-glyceryl N-(biphenyl 4-yl acetyl) glycinate, being a compound of claim 1.

* * * * *